US010846981B2

(12) United States Patent
Ambrecht et al.

(10) Patent No.: US 10,846,981 B2
(45) Date of Patent: Nov. 24, 2020

(54) GAMING MACHINE DISPLAY MOUNTING AND ALIGNMENT CONFIGURATION AND METHOD

(71) Applicant: AGS LLC, Las Vegas, NV (US)

(72) Inventors: Adam Daniel Ambrecht, Kennesaw, GA (US); Kevin Berwick Green, Atlanta, GA (US)

(73) Assignee: AGS LLC, Las Vegas, NV (US)

(*) Notice: Subject to any disclaimer, the term of this patent is extended or adjusted under 35 U.S.C. 154(b) by 32 days.

(21) Appl. No.: 16/103,488

(22) Filed: Aug. 14, 2018

(65) Prior Publication Data

US 2019/0096174 A1 Mar. 28, 2019

Related U.S. Application Data

(60) Provisional application No. 62/561,770, filed on Sep. 22, 2017.

(51) Int. Cl.
*G06F 17/00* (2019.01)
*G07F 17/32* (2006.01)

(52) U.S. Cl.
CPC ...... *G07F 17/3223* (2013.01); *G07F 17/3209* (2013.01); *G07F 17/3211* (2013.01); *G07F 17/3213* (2013.01)

(58) Field of Classification Search
None
See application file for complete search history.

(56) References Cited

U.S. PATENT DOCUMENTS

| | | | | |
|---|---|---|---|---|
| 5,813,914 | A * | 9/1998 | McKay | G07F 17/32 273/143 R |
| 7,862,436 | B2 * | 1/2011 | Cole | G07F 17/32 463/47 |
| 8,096,884 | B2 * | 1/2012 | Beadell | G07F 17/32 463/46 |
| 8,672,766 | B1 * | 3/2014 | Hancherick | G07F 17/3216 463/20 |
| 9,573,050 | B2 | 2/2017 | Thompson et al. | |
| 9,865,121 | B2 * | 1/2018 | Glenn, II | G07F 17/3216 |
| 9,997,010 | B2 * | 6/2018 | Lee | G07F 17/326 |
| 10,035,071 | B2 | 7/2018 | Thompson et al. | |
| 10,502,360 | B2 * | 12/2019 | Castro | F16M 13/022 |
| 2004/0018870 | A1 | 1/2004 | Cole | |
| 2007/0238531 | A1 * | 10/2007 | Taxon | G07F 17/32 463/46 |
| 2008/0113794 | A1 * | 5/2008 | Cole | G07F 17/32 463/31 |
| 2008/0182642 | A1 | 7/2008 | Cole | |
| 2013/0157751 | A1 * | 6/2013 | Loose | G07F 17/3211 463/25 |
| 2016/0093142 | A1 * | 3/2016 | Lamb | G07F 17/3216 463/20 |

* cited by examiner

*Primary Examiner* — Paul A D'Agostino
(74) *Attorney, Agent, or Firm* — Weide & Miller, Ltd.

(57) ABSTRACT

A gaming machine includes a video display mounting configuration, such as for mounting a secondary video display to a base cabinet having a first or primary video display. The mounting comprises connectors on a display frame which drop into mounts of a display support. The mounting may include a locking mechanism. An alignment configuration is also provided, such as for aligning different gaming machine components such as two video displays and/or light rings, trim or the like, relative to one another in three dimensions.

18 Claims, 18 Drawing Sheets

GAMING MACHINE DISPLAY MOUNTING AND ALIGNMENT CONFIGURATION AND METHOD

RELATED APPLICATION DATA

The present invention claims priority to, and incorporates entirely herein by reference, U.S. Provisional Application Ser. No. 62/561,770, filed Sep. 22, 2017.

FIELD OF THE INVENTION

The present invention relates to gaming machines having electronic video displays and methods of mounting and aligning those displays.

BACKGROUND OF THE INVENTION

Wager-based gaming machines have become increasingly complex. Originally, mechanical slot machines had metal cabinets which housed a plurality of spinning physical reels which displayed game symbols. The symbols were viewable through windows in a front of the gaming machine.

Much later, video gaming machines were developed, such as video poker and video slot machines. These gaming machines had a cabinet which housed a large CRT display. The CRT was supported on a shelf in the cabinet and was viewable through a glass covered opening in the front of the gaming machine.

CRT displays were later replaced with thinner and lighter LCD and similar displays. This allowed the displays to be mounted to the cabinet in other ways, such as to a front door of the cabinet.

Gaming machines continue to evolve, both relative to their method of manufacture and their aesthetic appearance. For example, gaming machines are often modular now and may include a base unit with a single main video display. The base unit may be configured to be expanded, such as to include one or more secondary displays, such as positioned at or above the top of the base gaming machine. In addition, the gaming machines may now include a variety of trim elements, lighting features and the like.

One issue with these new more sophisticated gaming machines is how to conveniently connect or mount the various components and make sure they are aligned. For example, in the case of a gaming machine having a base video display to which a secondary top display is to be added, a convenient and secure manner of mounting the secondary display must be provided. Also, it is necessary for trim and lighting features which extend between different portions of the gaming machine to align to create a satisfactory visual appearance.

An improved gaming machine display mounting and alignment configuration is desired.

SUMMARY OF THE INVENTION

Embodiments of the invention comprise gaming machines having a video display mounting configuration, such as for mounting a secondary video display to a base cabinet having a first or primary video display. The mounting comprises connectors which extend outwardly from a rear of a video display frame which drop into mounts of a display support. The display support may, for example, extend upwardly from a top of the base cabinet. The mounts may comprise apertures having sloping edges which lead to slots, whereby the connectors are guided downwardly into the slots.

The mounting may include a locking mechanism. The locking mechanism may comprise an actuation bar which is raisable to cause a locking arm to slide across into engagement with display mounting connectors, thus preventing them from being disengaged from their respective mounts.

Another embodiment of the invention is a component alignment configuration for aligning different gaming machine components. In one embodiment, the alignment configuration may be utilized to align two video displays and/or light rings, trim or the like, relative to one another in three dimensions.

In one embodiment, the alignment configuration comprises a Z position adjustment for a support to which a secondary video display frame (with or without other features such as a second light ring) is mounted. The Z position adjustment allows the position of arms of the support to be adjusted relative to the gaming machine cabinet in the front to back, or Z direction. The alignment configuration comprises X and Y position adjustment for a primary video display and first light ring mount. The X and Y position adjustment allows the position of this mount to be adjusted in the side to side, or X direction and the top to bottom, or Y direction relative to the cabinet. By utilizing the X, Y and Z position adjustment features, the positions of primary and secondary video displays and associated first and second light rings (or other features) may be adjusted so that they are in proper three dimensional alignment.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiments of the invention comprise a mounting configuration and method for a gaming machine display. Other embodiments of the invention comprise an alignment configuration and method for a gaming machine display.

The principles of the invention may be applied to gaming machines having various configurations. The gaming machine may be located at a casino (and as such may be referred to as a "casino gaming machine"). As described below, the gaming machine may be part of a gaming system, such as a casino gaming system which links two or more of the gaming machines or one or more gaming machines with other devices, such as one or more table games, kiosks, accounting systems or servers, progressive systems or servers, player tracking systems or servers or the like.

Figure 1:
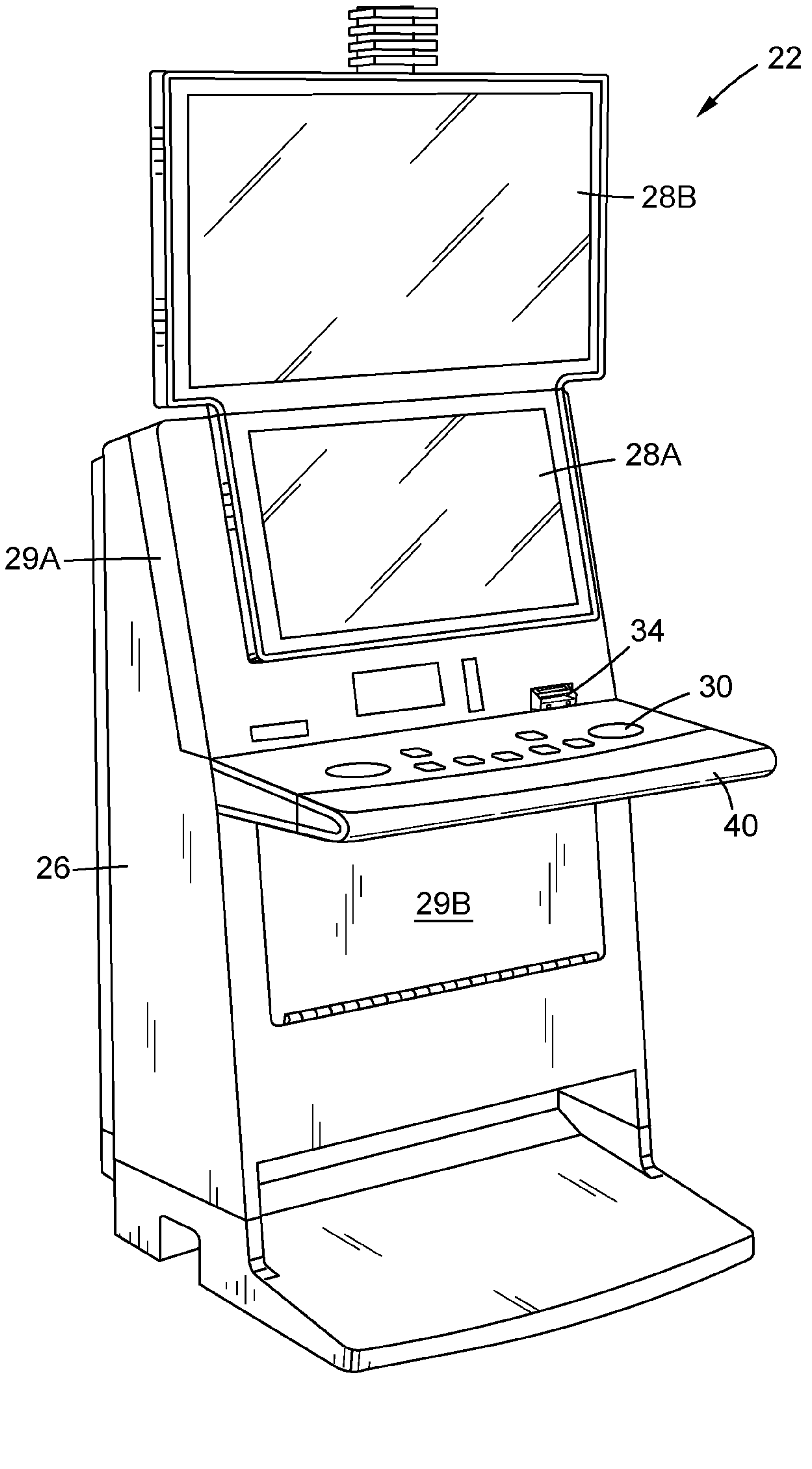
FIG. 1 illustrates one embodiment of a gaming machine in accordance with the invention.

One configuration of a gaming machine 22 of the invention is illustrated in FIG. 1. As illustrated, the gaming machine 22 generally comprises a housing or cabinet 26 for supporting and/or enclosing various components required for operation of the gaming machine. The cabinet 26 preferably includes one or more doors 29A,B or other access panels or features which can be moved between an open position which allows access to one or more interior portions of the gaming machine, and a closed position in which access to the one or more interior portions is generally prevented. The doors 29A,B may include locks or other features for securing them in their closed positions. The configuration of the gaming machine 22 may vary, such as having other shapes or dimensions.

The gaming machine 22 preferably includes at least one display device configured to display game information. The display device may comprise an electronic video display such as a cathode ray tube (CRT), high resolution flat panel liquid crystal display (LCD), projection LCD, plasma display, field emission display, digital micro-mirror display (DMD), digital light processing display (DLP), LCD touchscreen, a light emitting display (LED) or other suitable displays now known or later developed, in a variety of resolutions, sizes and formats (e.g. 4:3, widescreen or the like). The display device may be capable of projecting or displaying a wide variety of information, including images, symbols and other indicia or information associated with game play, game promotion or other events. The gaming machine 22 might include more than one display device, such as two or more video displays which are associated with the cabinet 26. For example, the gaming machine 22 illustrated in FIG. 1 includes a main or first video display 28A which is located at a front of the cabinet 26 and a secondary video display 28B which is positioned above the main video display 28A and extends above a top portion of the cabinet 26. The gaming machine 22 might also include a top box or other portion. Such a top box might include one or more display devices, such as in addition to one or more main displays which are associated with the cabinet 26. Also, the gaming machine 22 might include side displays (such as mounted to the exterior of the cabinet 26) and might include multiple displays of differing sizes. The gaming machine 22 might also include additional displays, such as a tertiary display which is located above the secondary video display 28B. Also, while the first and second video displays 28A,28B are illustrate as generally rectangular video displays which are mounted in landscape position, the one or more displays might be mounted in other orientations, such as in portrait orientation or combinations of different positions.

As described in more detail below, the gaming machine 22 is preferably configured to present one or more games upon a player making a monetary payment or wager. In this regard, as described in more detail below, the gaming machine 22 includes a mechanism or means for accepting monetary value.

In one embodiment, certain game outcomes (but preferably not all game outcomes) may be designated as winning outcomes (the non-winning outcomes may be referred to as losing outcomes). Prizes or awards may be provided for winning outcomes, such as monetary payments (or representations thereof, such as prize of credits), or promotional awards as detailed herein. As detailed below, the gaming machine 22 preferably includes a mechanism or means for returning unused monetary funds and/or dispensing winnings to a player.

The gaming machine 22 preferably includes one or more player input devices 30 (such as input buttons, plunger mechanisms, a touch-screen display, joystick, touch-pad or the like). These one or more devices 30 may be utilized by the player to facilitate game play, such as by providing input or instruction to the gaming machine 22. For example, such input devices 30 may be utilized by a player to place a wager, cause the gaming machine 22 to initiate a game, to "cash out" of the gaming machine, or to provide various other inputs. As illustrated, a button deck 40 may extend outwardly from the front of the cabinet 26 towards the player. The button deck 40 may support, for example, one or more of the input devices 30, such as buttons, a touch screen or the like.

In one preferred embodiment, the gaming machine 22 includes at least one microprocessor or controller for controlling the gaming machine, including receiving player input and sending output signals for controlling the various components or peripheral devices of the machine 22 (such as generating game information for display by the displays 28A,28B). The controller may be arranged to receive information regarding funds provided by a player to the gaming machine, receive input such as a purchase/bet signal when a purchase/bet button is depressed, and receive other inputs from a player. The controller may be arranged to generate information regarding a game, such as generating game information for display by the display 28A,28B, for determining winning or losing game outcomes and for displaying information regarding awards for winning game outcomes, among other things.

The controller may be configured to execute machine readable code or "software" or otherwise process information, such as obtained from a remote server. Software or other instructions may be stored at a memory or data storage device, e.g. in a fixed or non-transitory configuration. The memory may also store other information or data, such as data stored in table or other forms (including, but not limited to look-up tables, pay tables and other information, including tracked game play information). The gaming machine 22 may also include one or more random number generators for generating random numbers (such as implemented by a random number generator software module stored in the memory and executable by the processor or controller), such as for use in selecting game information and presenting the game in a random fashion (e.g. whereby the game is presented in a manner in which the player cannot control the outcome) or pseudo-random fashion (e.g. such as where the game includes a skill component which can affect the outcome of the game).

Preferably, the controller is configured to execute machine readable code or instructions (e.g. software) which are configured to implement the game. In this regard, the gaming machine is specially configured to present the game of the invention via specific software and/or hardware which causes the gaming machine to operate uniquely. For example, the controller of the gaming machine 22 may be configured to detect a wager, such as a signal from a player's depressing of the "bet one" button (such as one of the buttons 30). Upon such an event and/or the player otherwise signaling the gaming machine to present the game, the controller may be configured to cause the at least one display 28 to display unique information, such as a unique graphical interface or unique game display, including game symbols or other game information (such as graphically represented images of cards, slot symbols, dice, etc.). The controller may accept input from a player of game inputs, such as a request to spin reels or the like, via the one or more player input devices of the gaming machine 22. As indicated above, the machine-readable code may be configured in various manners, such as by having various "modules" of software which are designed to implement specific features of the game play or game presentation.

The gaming machine 22 may be configured to generate and present games in a stand-alone manner or it may be in communication with one or more external devices at one or more times. For example, the gaming machine 22 may be configured as a server based device and obtain game code or game outcome information from a remote game server (in which event the gaming machine controller may receive game information from the server, such as game outcome information, and use that server-generated information to present the game at the gaming machine). For example, the gaming machine 22 might be configured as a stand-alone device or as a server-based device for presenting games as Class III games (as defined by the U.S. Indian Gaming Regulatory Act) or as a server-based device for presenting games as Class II games (as defined by the U.S. Indian Gaming Regulatory Act).

As indicated, the gaming machine 22 is configured to present one or more wagering games. The gaming machines 22 is preferably configured to accept value, such as in the form of coins, tokens, paper currency or other elements or devices representing value such as monetary funds. Thus, as indicated above, the gaming machine 22 preferably includes a mechanism or means for accepting monetary value. For example, while not shown in FIG. 1, the gaming machine 22 might include a coin acceptor for accepting coins. Of course, associated coin reading/verifying devices and coin storage devices may be associated with the gaming machine 22 if it is configured to accept coins. Likewise, the gaming machine 22 might include a currency accepting device (not visible) having an acceptor slot or opening which is accessible through an access opening 34, such as in the front of the cabinet just above the button deck 40. As also described below, such a device may be configured to accept and read/verify paper currency and/or other media such as tickets (although the currency accepting device may be configured to accept and read not only currency, but tickets, media or elements other than currency, for ease of reference the device is referred to herein as a currency accepting device).

The gaming machine 22 might also be configured to read FOBs, magnetic stripe cards or other media having data associated therewith and via which value or funds may be associated with the gaming machine 22. The mechanism for accepting monetary value might also comprise hardware and/or software which allows a player to transfer (such as electronically) funds from an account, such as a casino wagering account, or a bank or other financial institution account. Such a mechanism might include a communication interface which permits the gaming machine to communicate with a mobile phone, PDA, tablet or other electronic device of the player (such as via a physical interface or wired or wireless communications links, such as to enable the transfer of funds from the player to the gaming machine or system).

When the player associates funds with the gaming machine or an associated system, a credit balance is generated. The credit balance may comprise a plurality of monetary value credits. The player may wager some or all of the associated monetary value, such as by wagering one or more of the credits associated with the credit balance. For example, the player might provide input to a wager button or touch screen interface to wager a certain number of credits (such as "Bet 1 Credit", "Bet 5 Credits", "Bet Maximum Credits" or other options). In one embodiment, when the player's wager is received, the player's credit balance is reduced by the number of wagered credits. The player might then provide a separate input to begin the game. In other embodiment, the player might select a "play game" input, such as by pressing a "spin" button, which input is taken to comprise both an instruction to place a wager (such as of a pre-set or pre-selected number of credits) and to start the game. Of course, other configurations may be implemented for accepting monetary value from the player and for allowing the player to place a wager from the associated monetary value.

In one embodiment, the gaming machine 22 is configured to award winnings for one or more winning wagering game outcomes. Such winnings may be represented as credits, points or the like. In one embodiment, the player may "cash out" and thus remove previously associated funds and any awarded winnings or such may otherwise be paid to the player. These winnings may be associated with the player's credit balance, thus increasing the player's credit balance.

In one embodiment, the player may provide an input to the gaming machine 22 to indicate their desire to cash out, such as by selecting a "cash out" button (such as implemented via one of the buttons 30) or touch screen feature or providing other input. In response, a monetary value represented by the player's credit balance or the like is preferably paid, transferred or otherwise provided to the player. For example, upon an award or at cash-out, associated funds may be paid to the player by the gaming machine 22 dispensing coins to a coin tray. In another embodiment, funds may be issued by dispensing paper currency or other media. In yet another embodiment, a player may be issued a media, such as a printed ticket, which ticket represents the value which was paid or cashed out of the machine. The aspects of gaming machine "ticketing" systems are well known. One such system is described in U.S. Pat. No.

6,048,269 to Burns, which is incorporated herein in its entirety by reference. In yet another embodiment, the cash-out might result in the dispensing of a card or other media which stores or represents the cashed-out funds, such as by writing funds information to a magnetic stripe of a card which is inserted into a media writer of the gaming machine or dispensed from the machine. In other embodiments, the cash-out mechanism may result in the funds value being transferred to an external device or account, such as a player's casino account (such as associated with a casino server), a remote bank or other financial account, or an electronic device such as a player's phone, PDA or tablet.

The gaming machine 22 may also include a player tracking device, such as a card reader and associated keypad. Such player tracking devices are well known and may permit the game operator to track play of players of the gaming machine. The tracked play may be utilized to offer player bonuses or awards.

A casino may have numerous such gaming machines 22, such as located on a casino floor or in other locations. Of course, such gaming machines 22 might be used in other environments, such as an airport, a bar or tavern or other locations.

It will be appreciated that the gaming machine illustrated in FIG. 1 is only exemplary of one embodiment of a gaming machine. For example, it is possible to for the gaming machine to have various other configurations, including different shapes and styles and having different components than as just described.

As noted, the gaming machine 22 may, as noted above, be part of a system which includes other devices. For example, the gaming machine 22 may communicate with one or more casino systems, such as a player tracking server or system, an accounting system or server, a ticketing system, a bonusing system, a tournament system, other gaming machines, and external devices.

As noted above, the gaming machine 22 includes a first or main display 28A and a secondary display 28B. In one embodiment of the invention, a mount is provided for mounting or connecting the secondary display 28B to the gaming machine 22.

Figure 2A:
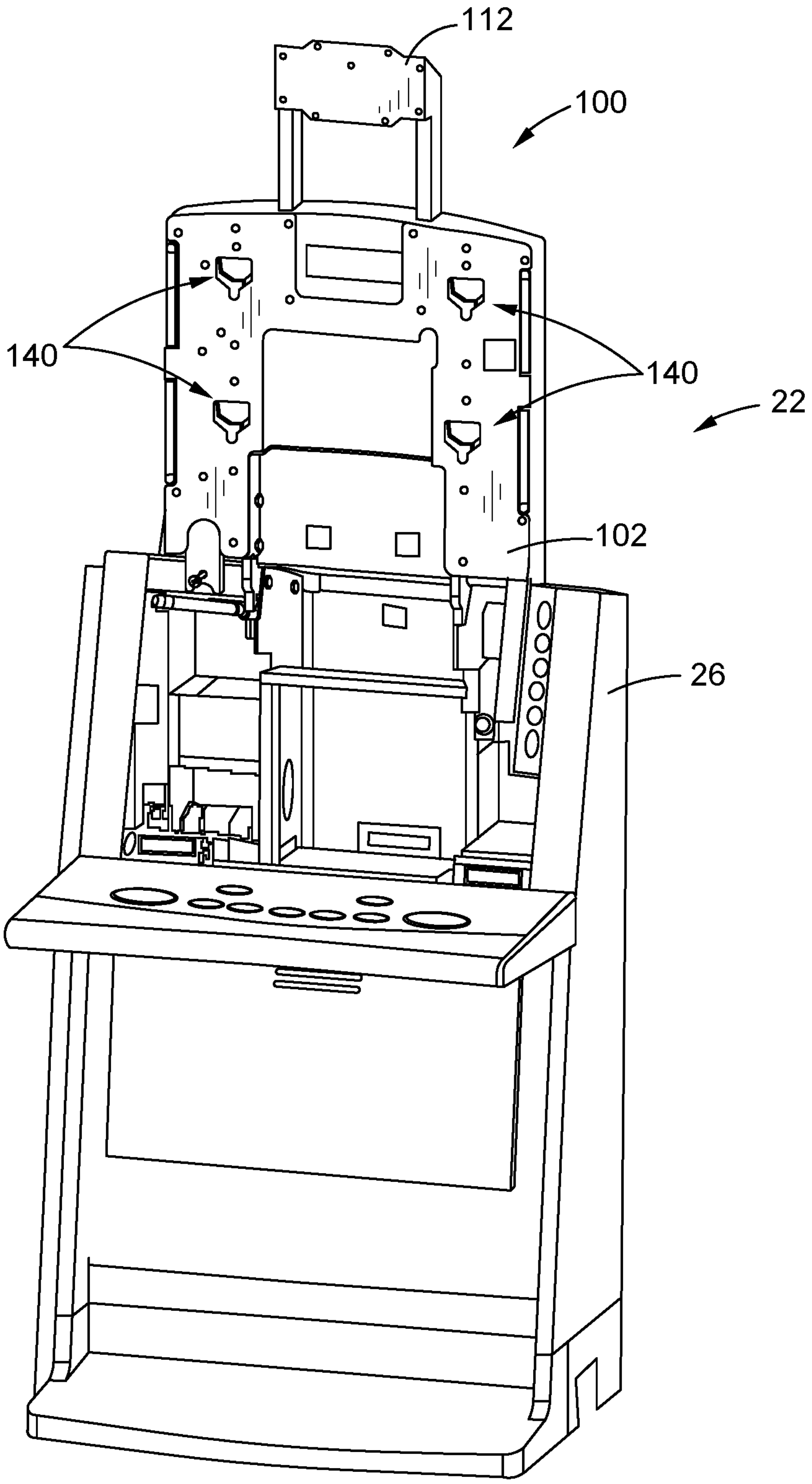
FIGS. 2A, 2B and 2C illustrate a secondary video display support of the gaming machine illustrated in FIG. 1.
Figure 2B:
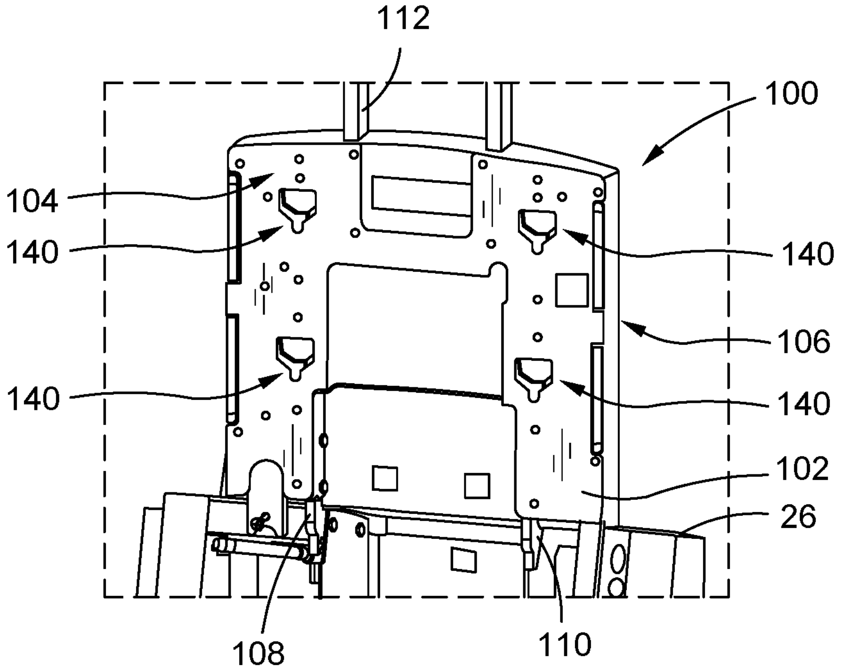

As illustrated in FIGS. 2A and 2B, a support 100 extends upwardly above the top of the cabinet 26 of the gaming machine 22. The support 100 comprises a generally planar mount or plate 102 having a front face 104 and a rear face 106. In one embodiment, the support 100 is generally square in shape, but it might have other shapes and sizes than as illustrated.

The support 100 is mounted to the cabinet 26, such as via a pair of arms 108,110. The arms 108,110 may, for example, bolt to the cabinet 26. In one embodiment, as illustrated, a tertiary display mount 112, which may be removably attached to the support 100, may extend upwardly from the support 100, such as for supporting a third or tertiary video display (not illustrated). In general, the support 100 comprises a rigid support structure for the secondary display 28B.

Figure 3A:
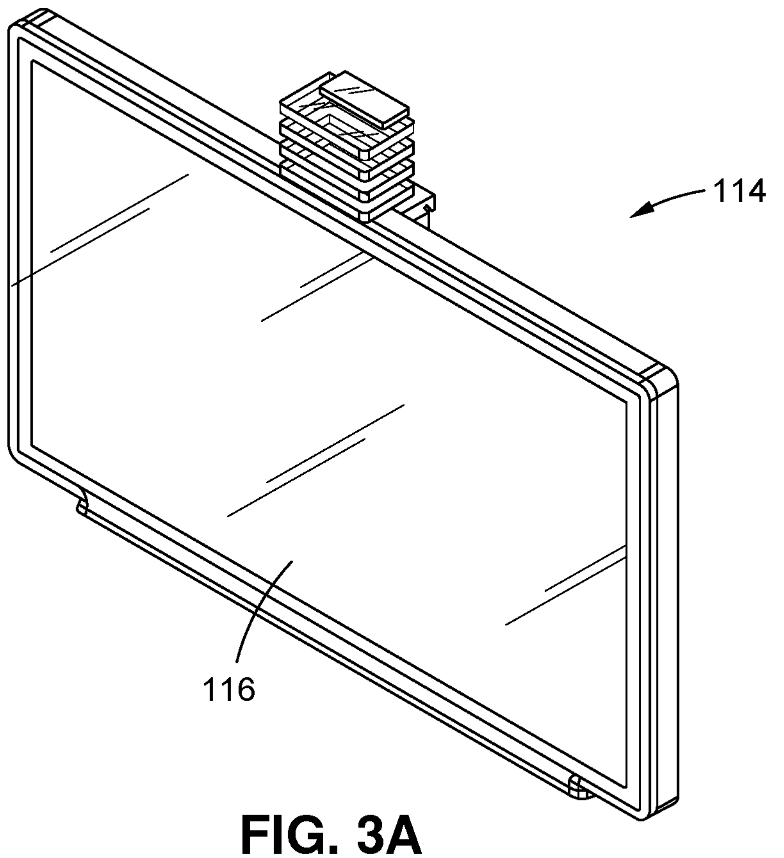
FIGS. 3A and 3B illustrate a secondary display mounting frame in accordance with the present invention.

In one embodiment, as illustrated in FIG. 3A, the secondary display 28B is mounted to a frame 114. The frame 114 has a front 116 and a rear 118. The secondary display 28B (not shown in FIG. 3A) is mountable to the frame 114 so as to be positioned at the front 116 thereof (so as to face outwardly towards a player of the gaming machine 22). The frame 114 preferably surrounds the display, such as to thereby extend closely around the outside edge or periphery of the display.

The frame 114, and thus the secondary display 28B mounted thereto, is removably connectable to the gaming machine 22, preferably by being removably connectable to the support 100. One or more connectors allow the frame 114 to be selectively connected to the support 100.

Figure 3B:
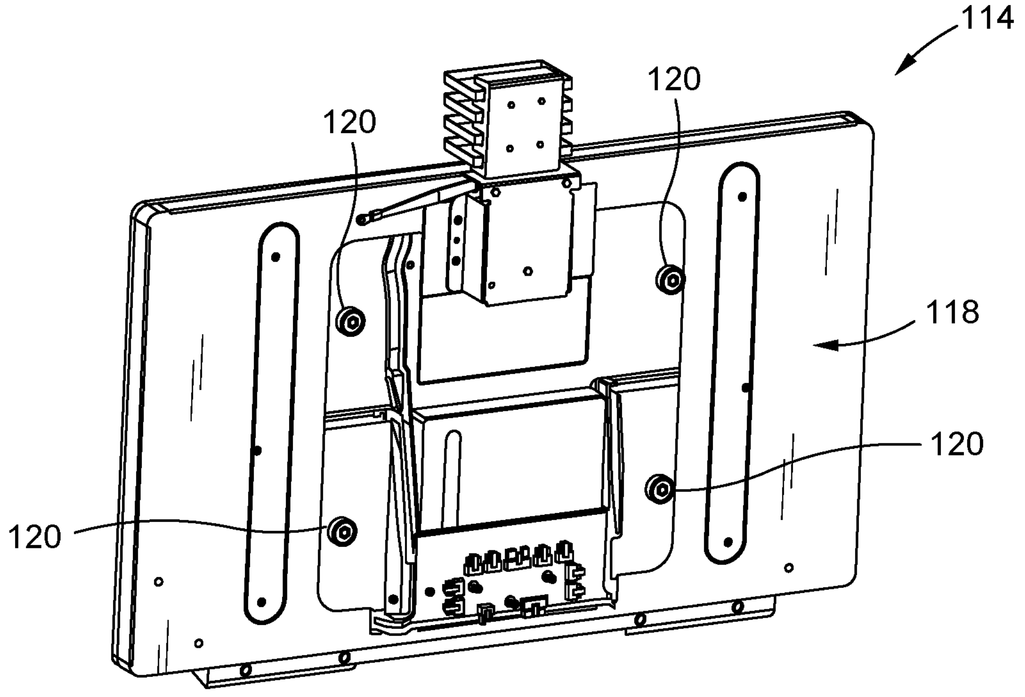
Figure 4:
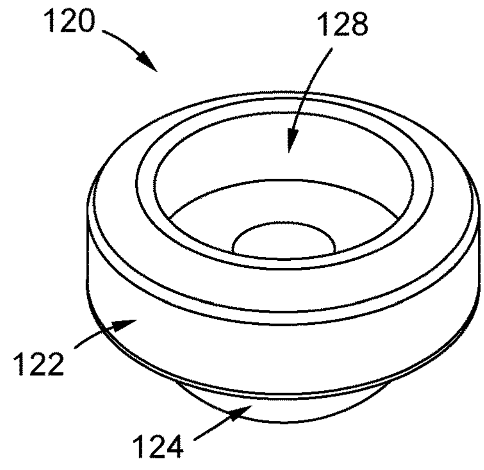
FIGS. 4, 4A, 4B and 4C illustrate a secondary display mount of the mounting frame illustrated in FIGS. 3A and 3B.
Figure 4A:
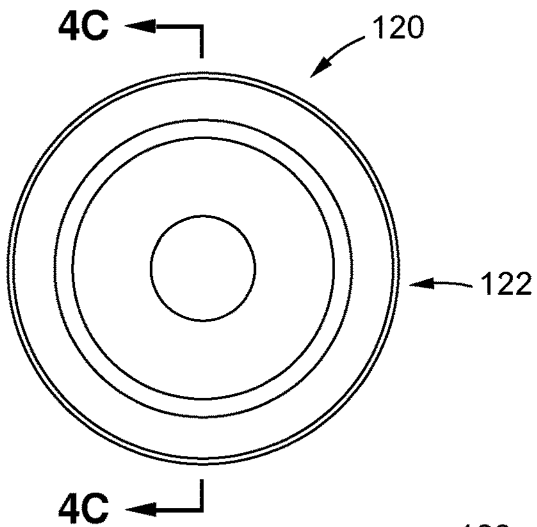
Figure 4B:
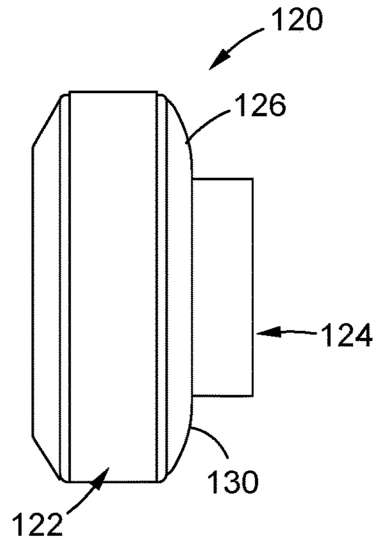
Figure 4C:
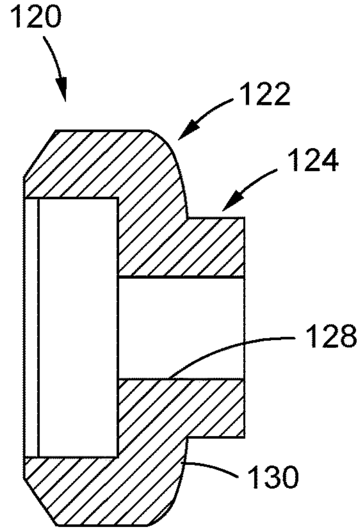

As illustrated in FIG. 3B, one or more connectors 120 extend outwardly from the rear of the frame 112. In one embodiment, the connectors 120 are button-like elements and four (4) of them are provided.

FIGS. 4 and 4A-4C illustrate additional aspects of the connectors 120. As illustrated, each connector 120 comprises a body which defines a head 122 and a base 124, the head 122 having one or more faces 126. Preferably, the head 122 and base 124 are generally circular in peripheral shape.

When mounted to the frame 114, such as via a threaded fastener which extends through a passage 128 through the connector 120, the base 124 abuts the frame 114 (as illustrated, the passage 128 may have a first enlarged portion to accommodate a head of the fastener and a second reduced dimension (smaller diameter) portion which accommodates a shank or shaft portion thereof).

In a preferred embodiment, the face 126 comprises a variable angle radial surface, such as at the back of an enlarged portion of the head 122 which faces the base 124. In one embodiment, the face 126 extends at an average angle of about 31 degrees relative to a vertical retention surface 130 which is located at the back of the head 122.

Figure 2C:
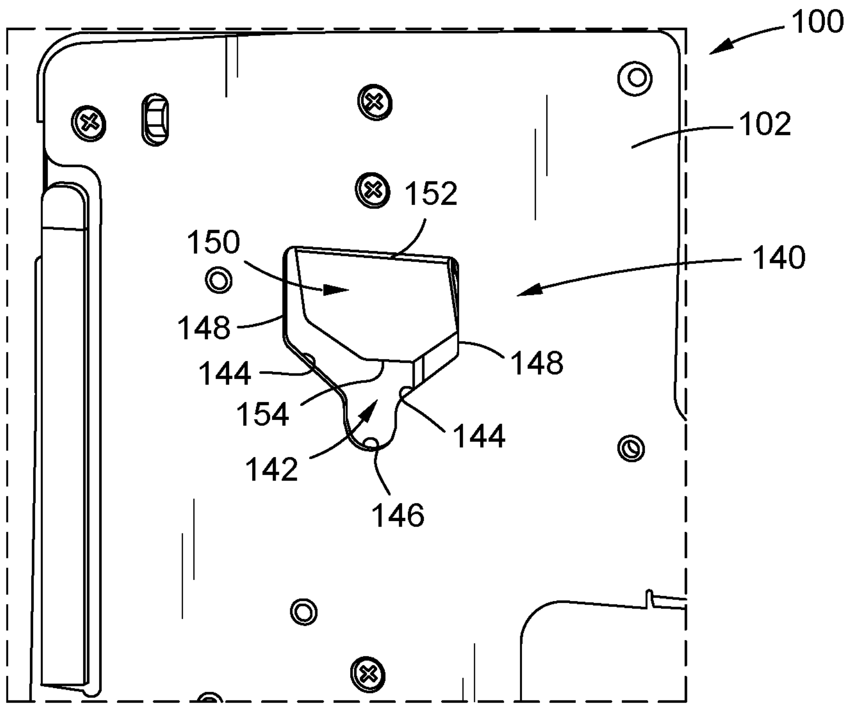

In one embodiment, the support 100 includes a mount 140 corresponding to each connector 120. Thus, where the frame 114 includes four (4) connectors 120, the frame 114 includes at least four (4) mounts 140, as best illustrated in FIGS. 2A and 2B. Referring to FIG. 2C, in one embodiment, each mount 140 comprises an aperture 142. As illustrated, the aperture 142 preferably has a central or enlarged portion which has a dimension great enough to accept a connector 120 therein. In this embodiment, side portions of the aperture 142 are defined by inwardly sloping edges 144 which lead to a narrower, generally "U'-shaped slot portion 146 of the aperture 142. The sloping edges 144 might, for example, slope downwardly and inwardly from a pair of opposing generally vertical side edges 148 which are spaced apart by a distance which is greater than the width of the "U" shaped slot portion 146 and the diameter of the body 122 of the connector 120.

As illustrated, each mount 140 may include a guiding flange 150. The guiding flange 150 may have a top edge 152 and an opposing bottom edge 154. The top edge 152 may be located at a top portion of the aperture 140 and be connected to or comprise a portion of the plate 102. The opposing bottom edge 154 is preferably located inwardly of the aperture 140 (such as extending outwardly from the rear of the support 100), preferably by a distance which is greater than the depth of the connector 120.

In use, the user positions the frame 114 so that the connectors 120 which extend outwardly from the back or rear 118 thereof each align with a corresponding mount 140 in the front face 104 of the support 100. The user moves the frame 114 towards the support 100 until the connectors 120 engage the guiding flanges 150, thus signaling that the connectors 120 have each entered the aperture 142 of the corresponding mount 140. The user then allows the frame 114 to drop downwardly, as guided by the guiding flanges 150 and sloping edges 144. In particular, the guiding flanges 150 engage the head 122 portion of the connectors 120, while the sloping edges 144 engage the base 124 portions thereof. The frame 114 is moved downwardly until the base 124 of each connector 120 is positioned in the "U"-shaped slot portion 146 of the mating aperture 142. At this time, the frame 114 (and any video display which is mounted thereto or later connected to the frame), is supported by the support 100. The sloping faces 126 of the connectors 120 allow the connectors 120 to settle into a tight position in the slot portions 146 by the connectors 120 sliding downwardly until the faces 126 thereof wedge against the plate 102.

An additional aspect of the invention is a display locking mechanism, such as for locking or fixing a video display in a mounted position. The locking mechanism has particular utility to the display mounting configuration just described.

In one embodiment, a locking mechanism 200 is configured to engage the display mounting connectors 120 described above, preventing them from moving out of engagement with their corresponding mounts 140.

Figure 5:
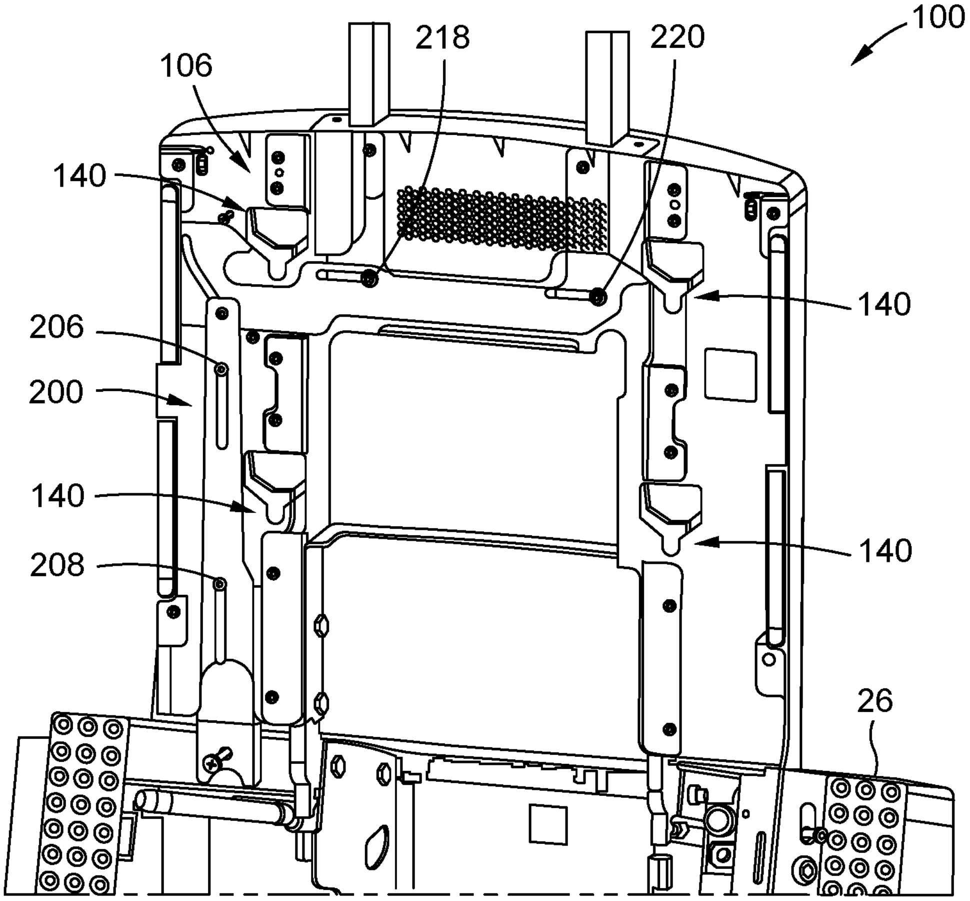
FIG. 5 illustrates a locking mechanism of the secondary video display support illustrated in FIG. 2.

In one embodiment, as illustrated in FIG. 5, the locking mechanism 200 is located at the rear side or face 106 of the support 100. As illustrated in FIG. 6, the locking mechanism 200 comprises an actuation bar 202 and a locking arm 204. In one embodiment, the actuation bar 202 has a first end and a second end and the locking arm 204 has a first end and a second end. The second end of the actuation bar 202 is mounted to the first end of the locking arm 204. In a preferred embodiment, movement of the actuation bar 202 causes movement of the locking arm 204, such as between a first unlocked position and a second locked position.

As illustrated in FIG. 5, the actuation bar 202 may be mounted in a generally vertical position to the support 100. The actuation bar 202 is mounted to be moved between a first lowered position and a second raised position, such as relative to pins 206,208 (see FIG. 5) which extend from the support 100 into engagement with corresponding slots 210, 212 in the actuation bar 202 (see FIG. 6). When the actuation bar 202 is generally vertically extending, the slots 210,212 are also generally vertically extending to facilitate vertical translation of the actuation bar 202. It is noted that as few as one pin and slot or more than two pins and corresponding slots might be provided. Further, the actuation bar 202 might be mounted for movement in other fashions, such as by having one or more pins which extend therefrom extend into slots in the support 100.

Figure 6A:
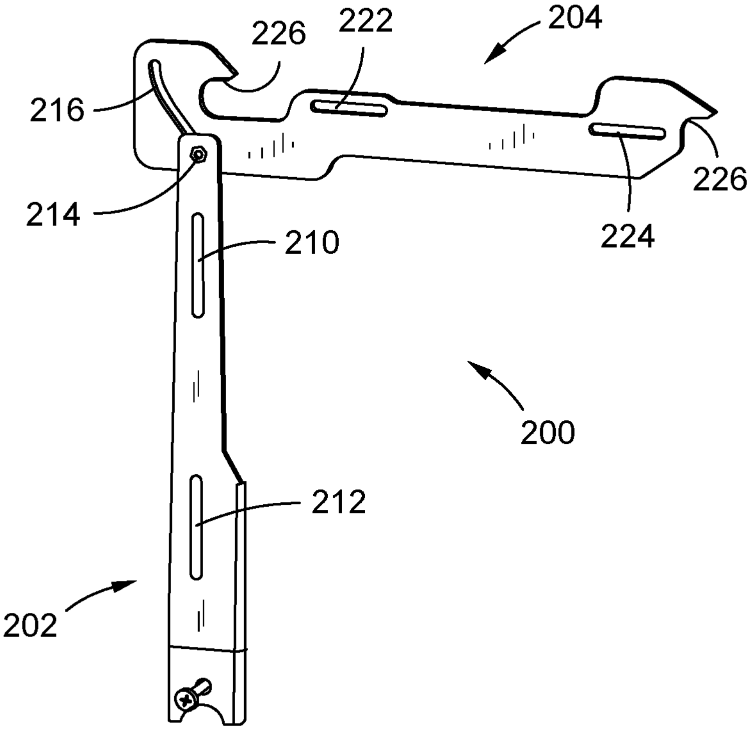
FIGS. 6A and 6B illustrate details of the locking mechanism illustrated in FIG. 5.
Figure 6B:
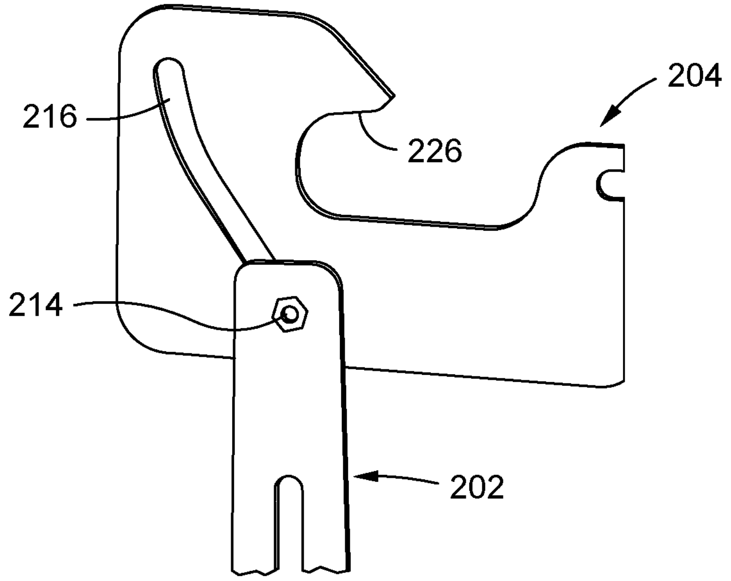

In one embodiment, as best illustrated in FIGS. 6A and 6B, a pin 214 extends from the second end of the actuation bar 202 into engagement with a sloping slot 216 in the locking arm 204. As illustrated in FIG. 5, the locking arm 204 is preferably movably mounted to the support 100, preferably in a generally horizontal position, such as via pins 218,220 which extend outwardly from the support 100 into engagement with horizontal slots 222,224 in the locking arm 204. As with the actuation bar 202, the locking arm 204 might be mounted for movement in other fashions, including by other numbers of pins and slots or other mounting configurations.

The locking arm 202 also preferably defines one or more catches 226. The catches 226 are preferably configured to engage or be positioned adjacent next to, a connector 120 when the actuation arm 202 is in its second locked position.

Figure 7A:
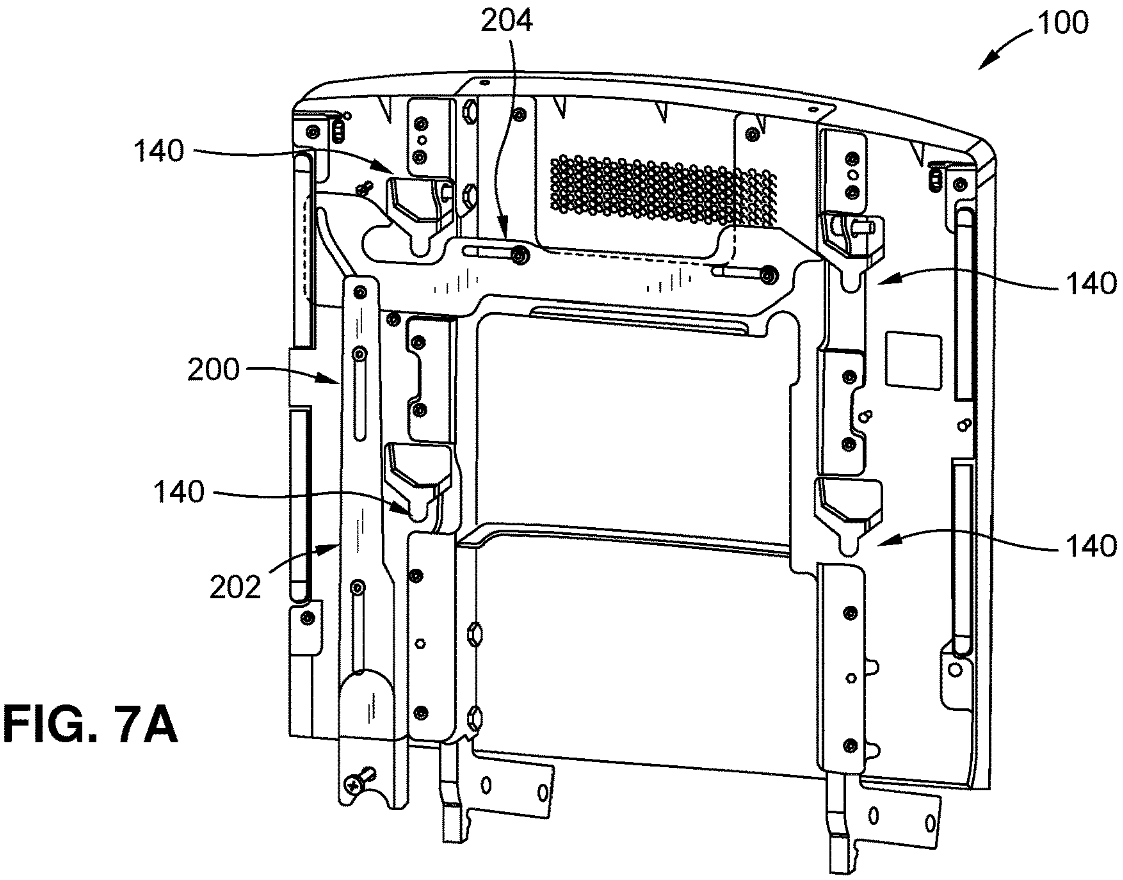
FIGS. 7A, 7B and 7C illustrate movement of the locking mechanism relative to the secondary video display support illustrated in FIG. 6.
Figure 7B:
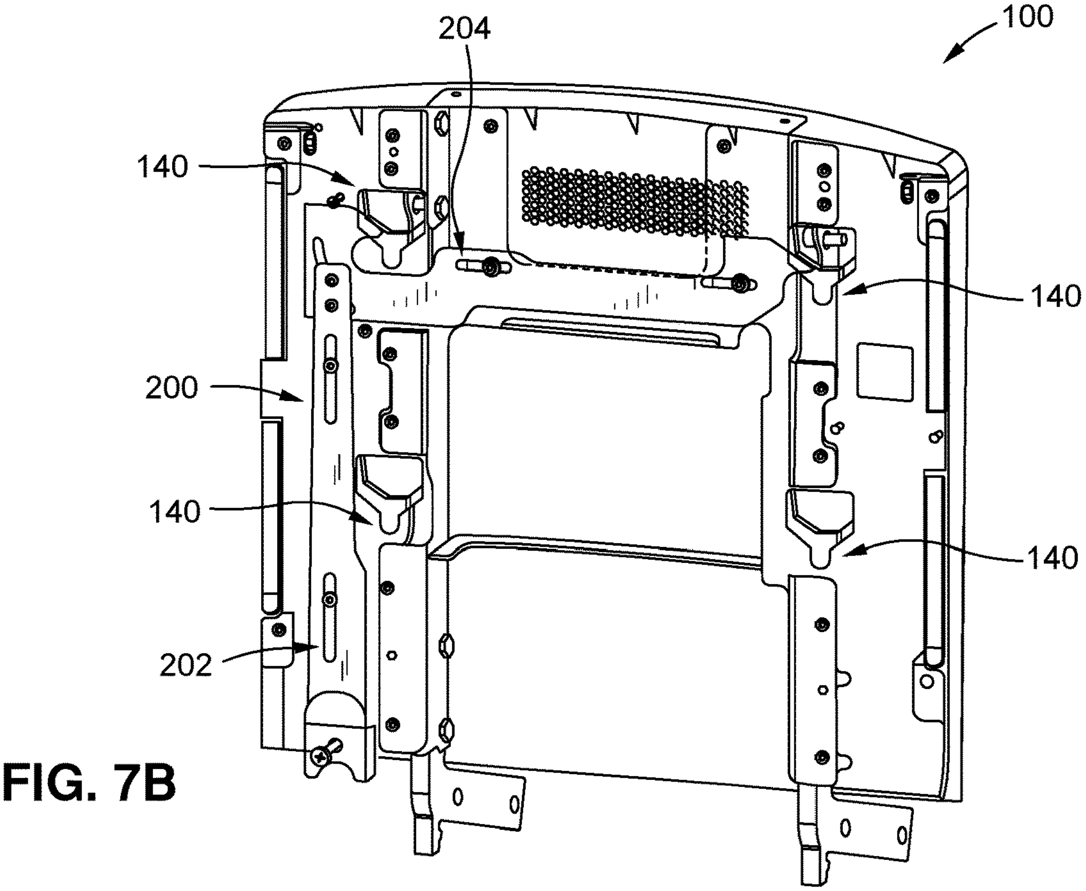
Figure 7C:
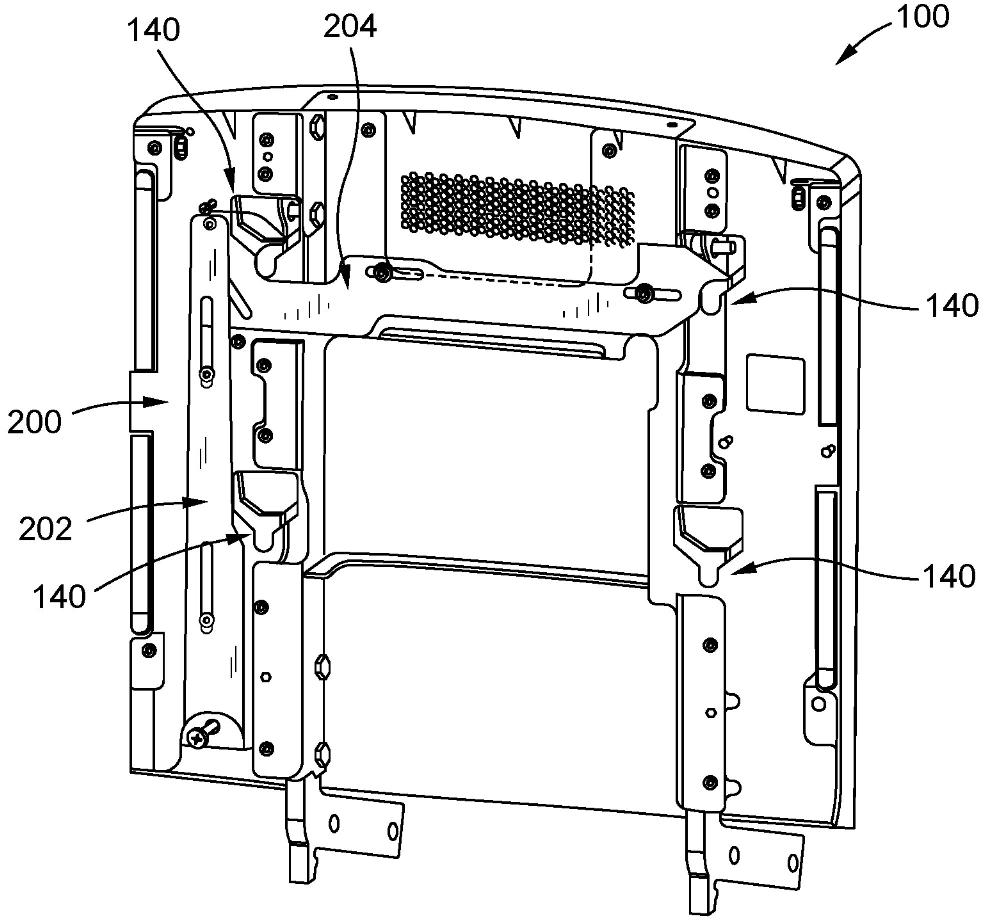

FIGS. 7A-7C illustrate operation of the locking mechanism 200. As illustrated, when the actuation bar 202 is in its first, lowered position, the pin 214 is in a lower portion of the slot 216 in the locking arm 204. In this position, the locking arm 204 is draw to and retained in its first, unlocked position (in this embodiment, a left-most position). In this position, the catches 226 of the locking arm 204 are drawn away from corresponding mounts 140 in the support 100 and any display mounting connectors 120 associated therewith.

As illustrated in FIG. 7B, when a user begins raising the actuation bar 202, the pin 214 begins to slide upwardly in the slot 216. Because the slot 216 is angled, this movement causes the locking arm 204 to be forced laterally or horizontally (to the right in the figures as illustrated).

Figure 8A:
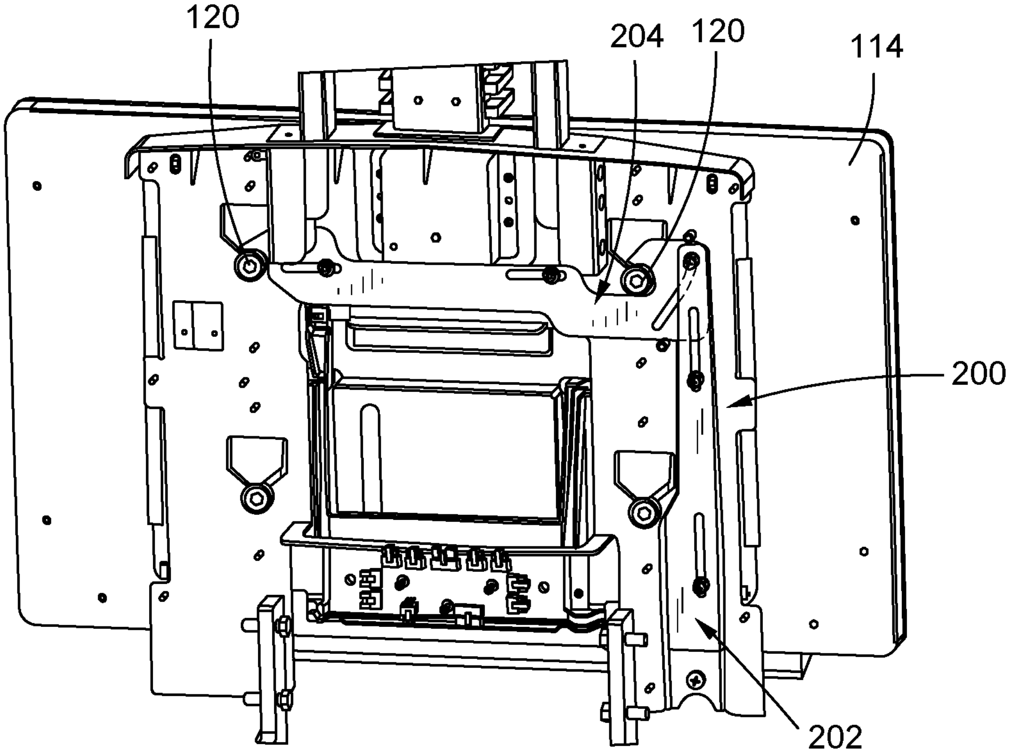
FIGS. 8A, 8B and 8C illustrate engagement of the locking mechanism illustrated in FIG. 6 with secondary display mounts.
Figure 8B:
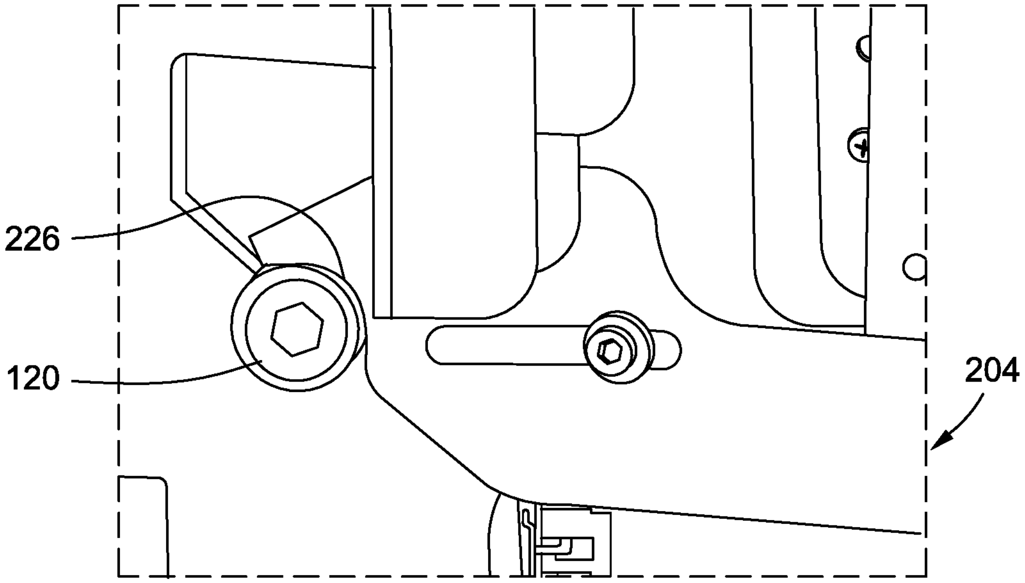
Figure 8C:
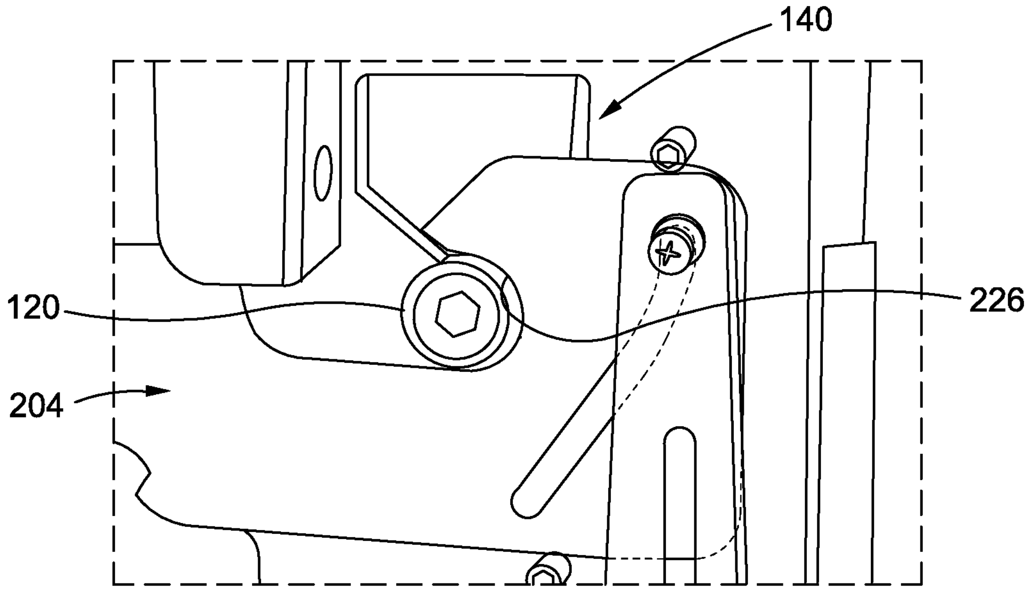

As illustrated in FIG. 7C, further upward movement of the actuation bar 202 causes the locking arm 204 to reach its second locked position. In this position, the catches 226 are positioned at the corresponding mounts 140. As illustrated in FIGS. 8A-8C, when a display is mounted to the support 100, the connectors 120 extend through the mounts 140. The catches 226 are then positioned in engagement with (touching or placed in close proximity to) those connectors 120. Further, the catches 226 are located or oriented so that they prevent upward movement of the connectors 120 out of the mounts 140.

Figure 9:
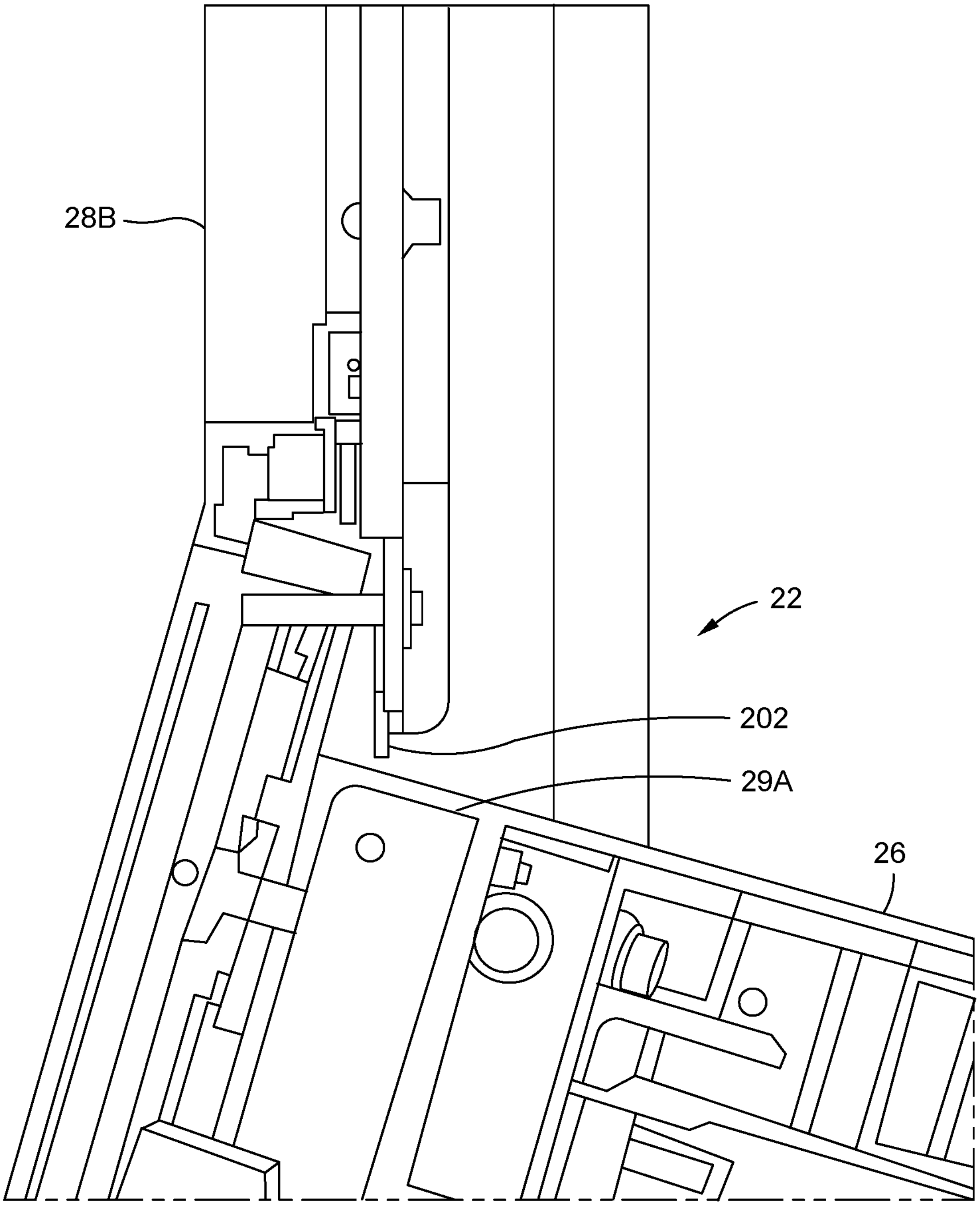
FIG. 9 illustrates a position of the locking mechanism illustrated in FIG. 6 relative to a portion of a cabinet of the gaming machine.

In one embodiment, the locking mechanism 200 is actuated when the door 29A (see FIG. 1) is in its open position. Once the locking mechanism 200 is moved to its locked position, that door may be closed. In this position, a portion of the door 29A preferably prevents the bottom or first end of the raised actuation arm 202 from moving downwardly, as illustrated in FIG. 9. Thus, once the door 29A is closed, the locking mechanism 200 is locked into its locked position and the locking mechanism cannot be released or disengaged from outside of the gaming machine, thus ensuring the display is retained in its mounting position (and can't be removed by theft, movement of the gaming machine, etc.).

Another aspect of the invention comprises a display alignment configuration for a gaming machine. One embodiment of such an alignment configuration will be described with reference to an embodiment of a gaming machine such as that illustrated in FIG. 1. As described, above, in that configuration, a second video display 28B is mounted above a first video display 29A. As further described above and illustrated in FIG. 2A, the second video display may be mounted to a support 100 which is connected to and extends above the main cabinet 26 of the gaming machine 22. In the embodiment illustrated in FIG. 1, the second video display 28B is positioned in close proximity or relationship to the first video display 28B. It is thus desirable to provide a position adjustment mechanism or configuration so as to allow the first and second video displays 28A,B to be adjusted into an aligned position.

Figure 10:
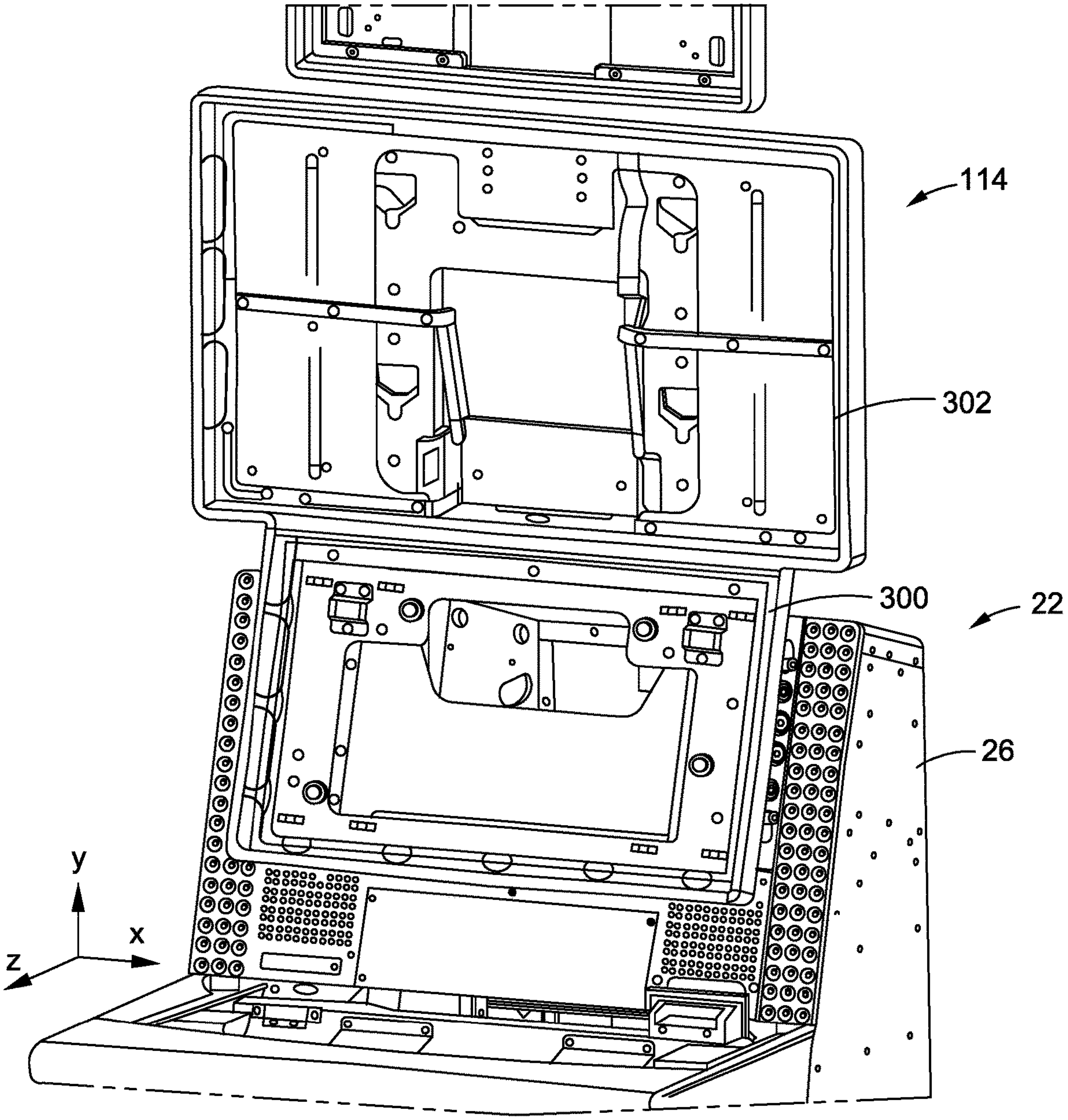
FIG. 10 illustrates first and second video display mounts and associated first and second light rings of the gaming machine illustrated in FIG. 1.

Moreover, in one embodiment one or more light rings, trims or other features may be associated with the first and second video displays 28A,B or related portions of the gaming machine 22, whereby it is desirable to ensure that those features are aligned as well. For example, as illustrated in FIGS. 1 and 10, a first light ring 300 may extend around at least a portion of the periphery of the first video display 28A, such as at least the sides thereof. A second light ring 302 may extend around at least a portion of the periphery of the second video display 28B, such as at least a portion of a bottom thereof adjacent to the first video display 28A. Such light rings 300,302 may have various configurations, such as comprising an illuminated material, a series of lights or light elements, etc.

Figure 11:
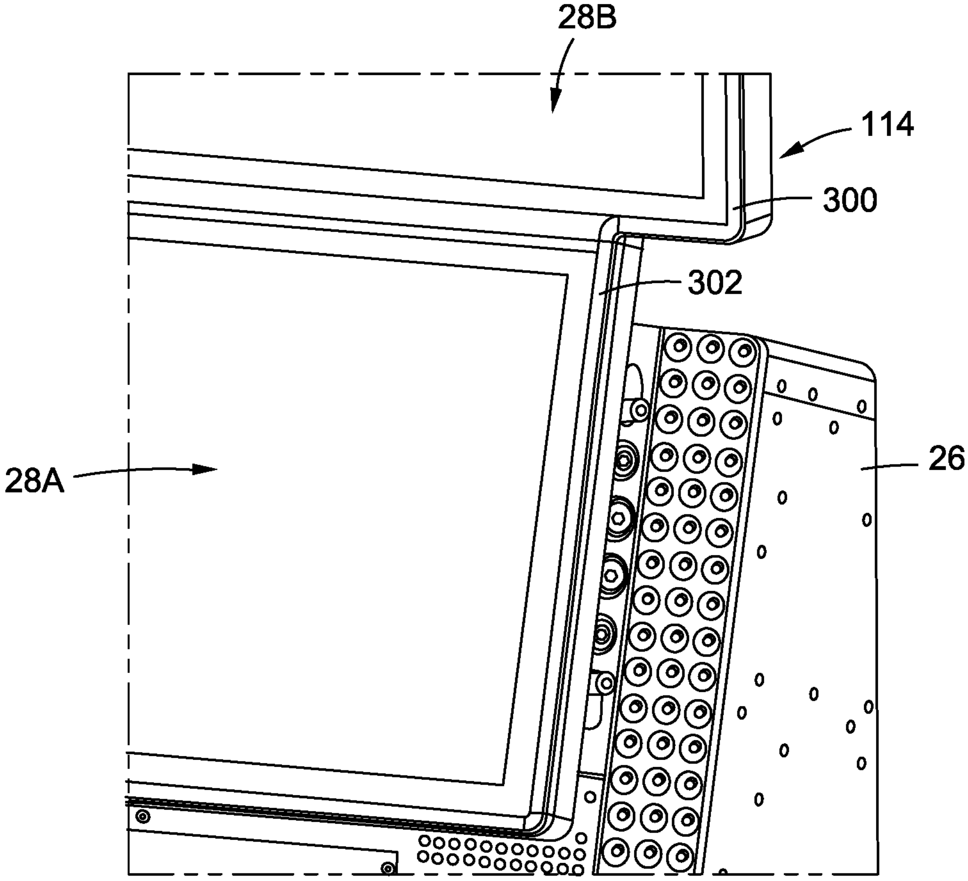
FIG. 11 illustrates an interface between the first and second light rings of FIG. 10 in greater detail.

As illustrated in FIG. 11, in one embodiment, a portion of the second light ring 302 may be designed to align with a portion of the first light ring 300, such as to make it appear that the first and second light rings 300,302 are actually a single contiguous feature. As noted above, it is desirable for these light ring portions to align with one another (if they don't, it creates an undesirable aesthetic appearance).

In one embodiment, as described above, the first video display 28A is mounted to a door 29A of the gaming machine 22. As illustrated in FIG. 10, the first video display 28A may be removable from the door 29A. Likewise, as described above, the second video display 28B may be mounted to a frame 114 which is in turn mounted to a support 100 (not visible in FIG. 10). In this embodiment, the first and second light rings 300,302 are mounted to or form a part of the door 29A and frame 114, respectively.

In a preferred embodiment of the invention, the alignment configuration permits position adjustment of two or more components relative to one another in the X, Y and Z directions (which directions are illustrated in FIG. 10, wherein the X direction corresponds to an axis or line which is generally or primarily from side-to-side through the gaming machine, the Y direction corresponds to an axis or line generally or primarily through the top and bottom of the gaming machine and the Z direction corresponds to an axis or line generally or primarily through the front and back of the gaming machine), thus ensuring that a user can completely align the component in three-dimensional space. In a preferred embodiment of the invention, the position of the second video display 28B can be adjusted in the Z direction (relative to the first video display 28A, for example), and the position of the first video display 28A (and the first light ring 300 and/or other features) can be adjusted in the X and Y directions (relative to the second video display 28B and the second light ring 302, etc.).

Figure 12:
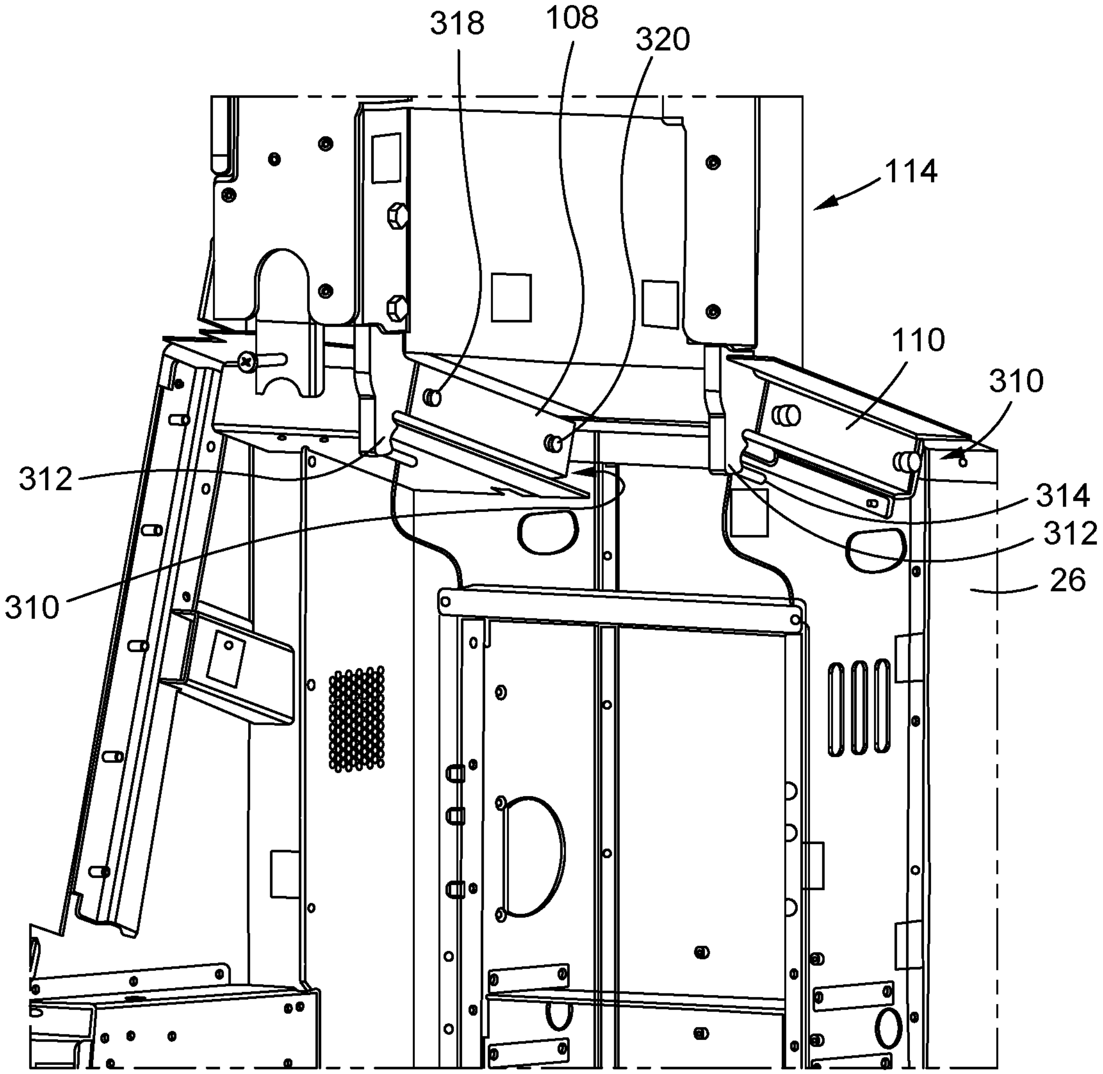
FIG. 12 illustrates mounting arms of a secondary video display support as connected to a cabinet of the gaming machine illustrated in FIG. 1.

As described above and illustrated in FIG. 2B, in one embodiment the second video display support 100 may be mounted to the gaming machine cabinet 26 via first and second arms 108,100. FIG. 12 illustrates additional details of this mounting. As illustrated therein, the first and second arms 108,100 each have a bottom portion which is designed to slide into a generally horizontal channel 310 which is defined by the gaming machine cabinet 26. The first arm 108 and second arm 110 preferably each have a tab portion 312 which extends downwardly for engagement by at least one adjustment screw 314. The adjustment screws 314 are movably connected to the cabinet 26. In this configuration, the position of the support 100, and thus the secondary video display mounting frame 114 and thus the second light ring 302 and the second video display 28B mounted to the mounting frame 114, may be positioned in the "Z" direction (e.g. to adjust the forward and backward position of the second video display 28B and second light ring 302 relative to the first video display 29A and first light ring 300). In particular, a user may adjust the position of the screws 314 to cause the support 100 to move in and out relative to the channels 310. It is noted that to the extent that the channels 310 are not horizontally extension, such as by angling slightly upward, adjustment of the arms 108,110 will change the position of the secondary video display mounting frame 114 in the "Z" direction, but also to some extent in the "Y" direction, whereby this adjustment mechanism is used to make the "Z" direction adjustment and wherein the "Y" direction alignment can be coordinated with the primary "Y" direction adjustment mechanism described below. Thus, while the "Z" direction mechanism just described may change the position of the secondary video display mounting frame 114 in both the "Z" and "Y" directions, it is referred to as the "Z" direction adjustment mechanism because that is its primary function/use.

Figure 13:
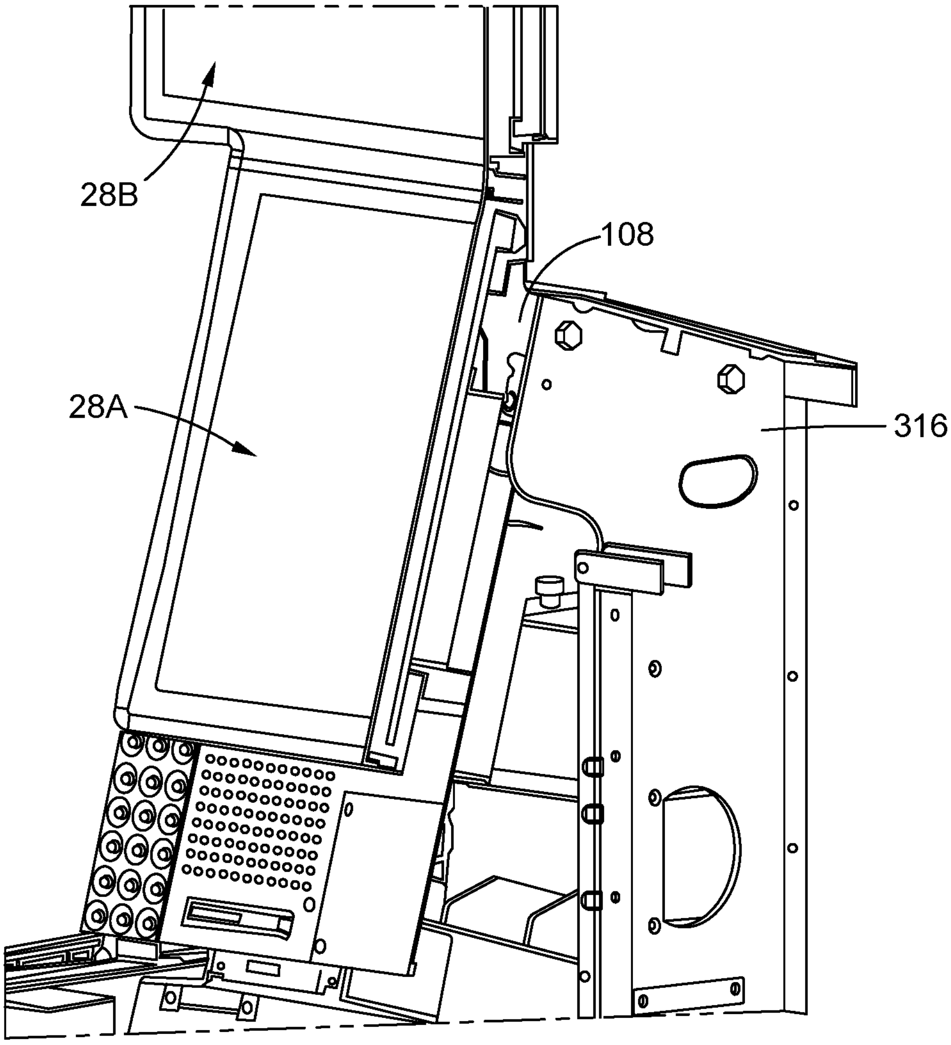
FIG. 13 illustrates a Z position adjustment for the secondary video display support of FIG. 12.

As illustrated in FIG. 13 (relative to the first arm 108), the channel 310 may be partly defined by a panel 316. In one embodiment, the first arm 108 includes a pair of slots 318,320 (see FIG. 12) for accepting bolts or other fasteners through the panel 316 and into those slots for fixing the position of the first arm 108 relative to the cabinet 112. Preferably, the same configuration is provided relative to the second arm 110.

In one embodiment, X and Y direction adjustment is provided via a mount 400 for the first video display 28A. In one embodiment, referring to FIG. 14, the first video display 28A is designed to be mounted to the mount 400. The first light ring 300 is also connected to the mount 400. The position of the mount 400 can be changed relative to the gaming cabinet 26, such as the door 29A.

Figure 14:
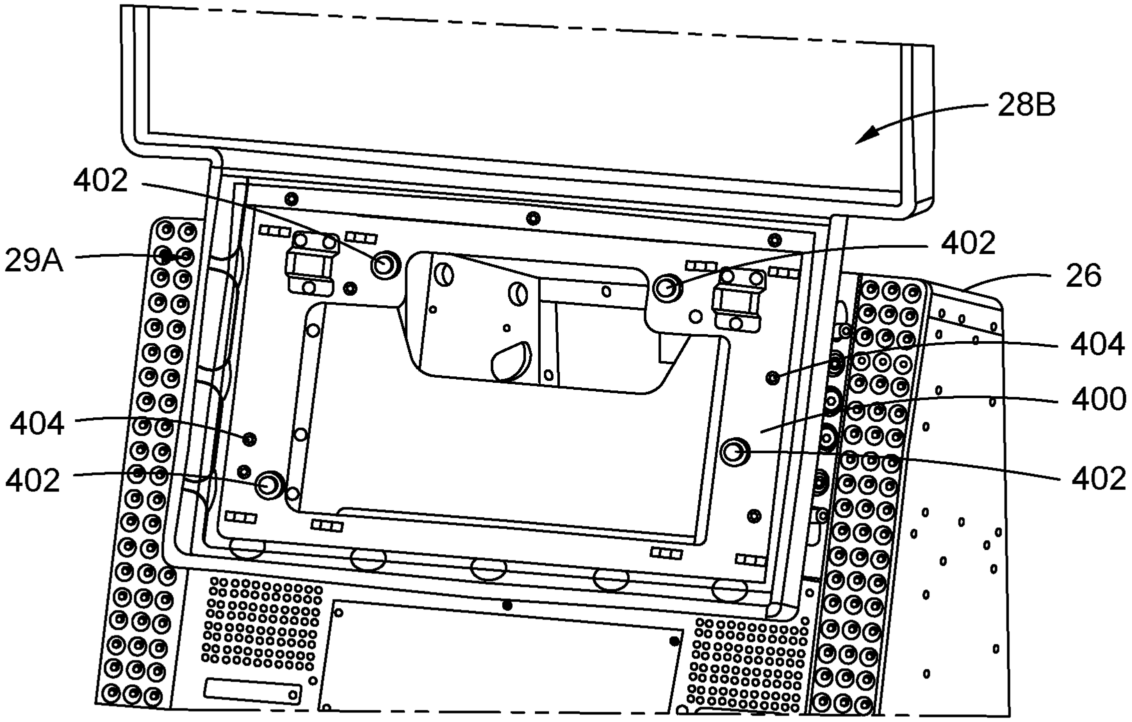
FIG. 14 illustrates an X and Y position adjustment for the first video display mount illustrated in FIG. 10.

As illustrated in FIG. 14, one or more fasteners 402 (such as screws, bolts or other treaded or unthreaded fasteners) pass through the mount 400 into the underlying cabinet 26, such as the door 29A. In one embodiment, there are four (4) fastener 402, but there may be other numbers (most preferably, at least two (2)). The fasteners 402 may each pass through an aperture or slot (not shown) in the mount 400 which is slightly larger than the fastener (such as larger than the diameter of the shank thereof but not the head thereof), thus allowing the position of the mount 400 to be changed with the fasteners 402 in place but not tightened. Once the mount 400 is in the desired position with the first light ring 300 aligned with the second light ring 302 in both the X and Y directions, then the fasteners 402 may be tightened to hold the mount 400 in position.

Figure 15:
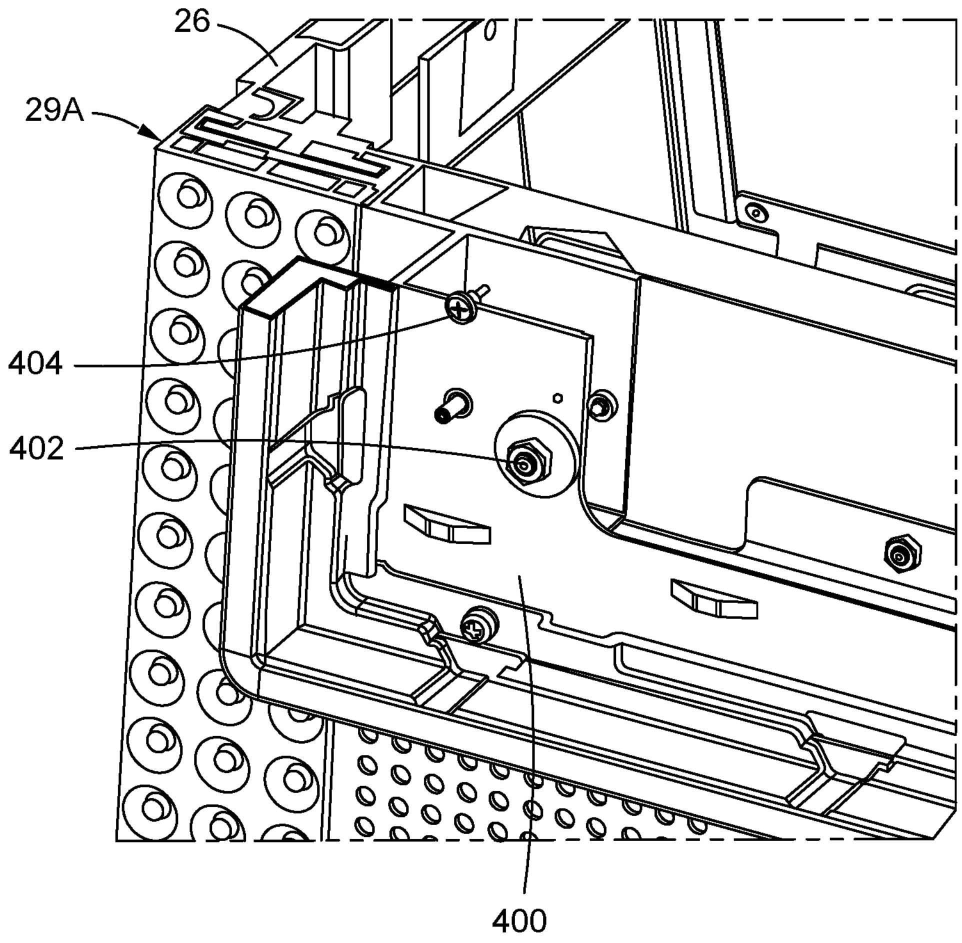
FIG. 15 illustrates a connection of the first video display mount of FIG. 14 to an underlying gaming machine cabinet.

In a preferred embodiment, as better illustrated in FIG. 15, one or more secondary fasteners 404 may be used to permanently fix the position of the mount 400. For example, in one embodiment, one or more holes or apertures (not shown) may be provided in the mount 400. A secondary fastener 404 such as a zip screw may be passed through each aperture into the mount 400 and into a portion of the cabinet 26 behind it, such as into a beam, strut, plate or the like of the door 29A. Such a fastener 404 may self-tap into that supporting structure, thus fixing the position of the mount 400.

In one embodiment, as illustrated in FIG. 14, the main display mount 400 may include an opening or window therein. In a preferred embodiment, this allows a user to reach the Z position adjustment device or mechanism described above (such as the arm positioning screws for the secondary video display support) therethrough. As noted below, this allows a user to adjust the Z position with the main door 29A closed, which has a number of advantages.

Various features and advantages or the invention will now be described. One aspect of the invention is a video display or monitor mount for a gaming machine. The display mount allows a display to be added to a base gaming machine, such as at a top of the gaming machine. The display mount may allow a secondary or additional (tertiary, etc.) video display to be added. The video display mounting configuration has a number of advantages. First, the mounting configuration allows a user to mount a video display frame to a support while the video display is not mounted to the frame, thus protecting the additional video display from damage during the mounting process. The mounting configuration is simple, only requiring the user to place connectors into mounts which then self-mount or align the video display frame to the support in a secure manner (with gravity holding the video display frame to the support).

In one embodiment, the video display mount may include a locking mechanism which is simple to operate and prevents the video display (and its frame) from being disconnected from the support and the gaming machine—whether such is inadvertent (such as because of movement of the gaming machine) or intentional (such as if an unauthorized person were to attempt to remove the video display). This locking mechanism cannot be unlocked from outside of the gaming machine, but can only be unlocked by an authorized person opening a door of the gaming machine (which is preferably locked with one of more locks).

This mounting configuration maintains the video display in position and prevents movement during assembly, shipment, installation and movement of the gaming machine, while still maintaining ease of serviceability and re-installation (for example, if the second video display needed to be removed for service in the field, the locking mechanism can be unlocked and the secondary video display can be removed from the support).

The button-shape connectors in combination with a mounting aperture having a guide flange and sloping sides leading to a mounting slot allows the display to be mounted in any orientation (it allows the display to be mounted in portrait or landscape position) and facilitates the user's alignment of the heavy video displays with the support.

As noted, while the mounting configuration has been described with reference to the mounting of a secondary video display to a support extending upwardly from a cabinet of a gaming machine, the mounting (and locking) configuration could be applied to the mounting of other displays, including mounting of a main display to the front of the gaming machine or to tertiary or other additional video displays.

Another advantage of the invention is an alignment configuration or mechanism for aligning components of a gaming machine. In one embodiment, the alignment configuration allows a user to adjust the positions of two adjacent components of the gaming machine relative to one another in three-dimensions. In a preferred embodiment, a simple adjustment configuration is provided where a first adjustment is provided relative to one component (such as adjustment of a secondary display mount in the Z direction) and a second adjustment is provided relative to a second component (such as adjustment of the main display mount in the X and Y direction). Both adjustment mechanism are simple to operate or employ and can be utilized during gaming machine assembly to ensure proper alignment of components.

The alignment configuration and method have particular utility to first and second gaming machine video displays. A particular advantage of the invention is that the positions of a secondary video display frame and a first video display mount can be adjusted without the first and second video displays being connected to the gaming machine. This reduces the chances of damage to those video displays during the assembly and alignment process. In addition, in a preferred embodiment the position adjustment can be done with the doors of the cabinet closed so that the user can verify position alignment during the alignment process (again protecting sensitive electronics and the like during the gaming machine assembly or adjustment process).

As noted, the alignment configuration and method have particular utility to the alignment of adjacent displays and/or light rings, but could be applied to other features of a gaming machine. These might include, but are not limited to second and third video displays, non-illuminated rings or other trim features or other separate components of a gaming machine where it is desirable for those separate components to be aligned).

It will be appreciated that other types of mounting elements and adjustment devices may be utilized relative to the invention. For example, while the locking mechanism may be manually movable, in other embodiments the actuation bar might be raised and lowered by a motor. Also, at least one means for biasing might bias the locking arm in to its locking position.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A gaming machine comprising:

a cabinet defining at least one interior space a first video display located at a front of said cabinet;

at least one player input device;

a memory device;

a controller;

machine-readable code stored in said memory device and executable by said controller to present one or more wagering games comprising the display of game information via said at least one display device;

a secondary video display, said secondary video display connected to a frame, said frame connected to a support via at least one connector which extends outwardly from a rear of said frame and into a mount in said support, said support extending upwardly from a top of said cabinet, whereby said secondary video display is located above said first video display; and a locking mechanism, said locking mechanism comprising an actuation bar and a locking arm, said actuation bar mounted for movement between a first lowered position and a second raised position, said actuation bar connected to said locking arm, said locking arm moving from a retracted position to a locking position when said actuation bar moves from said first lowered position to said second raised position, said locking arm in said locking position preventing upward movement of said at least one connector out of engagement with said mount.

2. The gaming machine in accordance with claim 1 further comprising a door which is movable relative to said cabinet between an open and a closed position, said door in said open position providing access to at least a portion of an interior space of said cabinet, wherein said locking arm is movable to said first lowered position when said door is in said open position and wherein said door blocks movement of said locking arm to said first lowered position when said door is in said closed position.

3. The gaming machine in accordance with claim 1, wherein said mount comprises an aperture having an enlarged portion leading to a narrower slot portion and said at least one connector comprises a head and a base, wherein when said frame is in a first position said head may pass through said enlarged portion of said aperture and when said frame is moved downwardly to a second position said base of said connector extends into said slot portion of said aperture.

4. The gaming machine in accordance with claim 3, wherein said locking arm in said locking position prevents movement of said connector upwardly out of said slot portion of said aperture.

5. The gaming machine in accordance with claim 1, wherein said locking arm defines a slot which accepts a pin of said actuation bar, which pin moves along said slot when said actuation arm is actuated.

6. The gaming machine in accordance with claim 1, wherein said locking arm is mounted to said support for movement in a generally horizontal direction.

7. A method of mounting a secondary video display to a gaming machine, comprising the steps of:

providing a gaming machine having a cabinet defining at least one interior space, a first video display located at a front of said cabinet, and a support extending upwardly above a top of said cabinet, said support having a face and an aperture in said face, said aperture comprising an enlarged portion leading to a narrower slot portion;

providing a secondary video display connected to a frame and having a connector extending outwardly from said frame;

positioning said secondary video display at a first elevation;

extending said connector into said enlarged portion of said aperture; and moving said secondary video display downwardly to a second elevation until said connector engages said slot portion of said aperture.

8. The method in accordance with claim 7 further comprising a flange positioned behind at least a portion of said enlarged portion of said aperture and wherein said step of extending said connector into said enlarged portion of said aperture comprises extending said connector into said enlarged portion of said aperture until said connector hits said flange.

9. The method in accordance with claim 7 wherein said connector comprises a head and a base extending between said head and said frame, said head having a larger dimension than said base, and wherein when said connector engages said slot portion of said aperture, said base is located in said slot and said head is positioned behind said support, preventing said secondary video display from being moved outwardly of said support.

10. The method in accordance with claim 7, further comprising the step of moving a locking mechanism into a position which prevents upward movement of said secondary video display relative to said support.

11. The method in accordance with claim 7, wherein said step of moving comprises moving a locking arm upwardly from a lowered position to a raised position.

12. The method in accordance with claim 7, wherein said step of moving a locking mechanism comprises moving a locking arm horizontally from a first position in which is does not impede upward movement of said connector and a second position in which it does impede upward movement of said connector.

13. A gaming machine comprising:

a cabinet defining at least one interior space a first video display located at a front of said cabinet;

at least one player input device;

a memory device;

a controller;

machine-readable code stored in said memory device and executable by said controller to present one or more wagering games comprising the display of game information via said at least one display device; and a secondary video display, said secondary video display connected to a frame, said frame connected to a support via at least one connector which extends outwardly from a rear of said frame and into a mount in said support, wherein said mount comprises an aperture having an enlarged portion leading to a narrower slot portion and said at least one connector comprises a head and a base, wherein when said frame is in a first position said head may pass through said enlarged portion of said aperture and when said frame is moved downwardly to a second position said base of said connector extends into said slot portion of said aperture, said support extending upwardly from a top of said cabinet, whereby said secondary video display is located above said first video display when connected to said support.

14. The gaming machine in accordance with claim 13 wherein said aperture defines sloping edges leading from said enlarged portion to said slot portion.

15. The gaming machine in accordance with claim 14 wherein said mount further comprises a flange positioned behind said enlarged portion of said aperture, said flange configured to act as a stop which engages said head of said connector when said connector is passed into said enlarged portion of said aperture.

16. The gaming machine in accordance with claim 13, wherein four connectors extend outwardly from said frame and four mounts are provided in said support, each of said four mounts comprising an aperture in said support.

17. The gaming machine in accordance with claim 13, wherein said head and base are both generally circular in peripheral shape, said base having a smaller peripheral dimension than said head.

18. The gaming machine in accordance with claim 13, wherein said head has a front and a rear, said base extending from said rear, said rear of said head comprising a face comprising a variable angle radial surface.

* * * * *